United States Patent
Tanaka et al.

(10) Patent No.: US 9,732,243 B2
(45) Date of Patent: *Aug. 15, 2017

(54) WATER-BASED INK FOR INK-JET RECORDING AND INK CARTRIDGE

(71) Applicant: Brother Kogyo Kabushiki Kaisha, Nagoya-shi, Aichi-ken (JP)

(72) Inventors: Hiroyuki Tanaka, Inazawa (JP); Mitsunori Maeda, Nagoya (JP); Yuki Okumura, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,647

(22) Filed: Aug. 18, 2016

(65) Prior Publication Data

US 2017/0088730 A1 Mar. 30, 2017

(30) Foreign Application Priority Data

Sep. 30, 2015 (JP) .................. 2015-195501

(51) Int. Cl.
| | |
|---|---|
| C08F 287/00 | (2006.01) |
| C09D 11/36 | (2014.01) |
| C09D 11/107 | (2014.01) |
| C09D 11/322 | (2014.01) |
| C09D 11/38 | (2014.01) |
| C08F 220/10 | (2006.01) |

(Continued)

(52) U.S. Cl.
CPC ............ *C09D 11/36* (2013.01); *C09D 11/107* (2013.01); *C09D 11/322* (2013.01); *C09D 11/38* (2013.01); *C08F 212/06* (2013.01); *C08F 220/06* (2013.01); *C08F 220/10* (2013.01); *C08F 257/00* (2013.01); *C08F 265/02* (2013.01); *C08F 265/06* (2013.01); *C08F 287/00* (2013.01); *C08F 293/005* (2013.01)

(58) Field of Classification Search
CPC .................... C08F 297/026; C08F 293/005
See application file for complete search history.

(56) References Cited

U.S. PATENT DOCUMENTS

| | | |
|---|---|---|
| 4,508,880 A | 4/1985 | Webster |
| 5,085,698 A | 2/1992 | Ma et al. |

(Continued)

FOREIGN PATENT DOCUMENTS

| | | |
|---|---|---|
| EP | 851012 A2 | 7/1998 |
| EP | 2330154 A1 | 6/2011 |

(Continued)

OTHER PUBLICATIONS

Mar. 2, 2017—(EP) Extended Search Report—App 16184821.3.

*Primary Examiner* — Richard A Huhn
(74) *Attorney, Agent, or Firm* — Banner & Witcoff, Ltd.

(57) ABSTRACT

A water-based ink for ink-jet recording includes: a pigment; water; oligoethylene glycol monoalkyl ether; and a water-soluble resin. The water-soluble resin is an ABA-type tri-block copolymer which has a polymer block A composed only of methyl methacrylate and methacrylic acid and a polymer block B composed only of benzyl methacrylate and methacrylic acid; which has a weight average molecular weight of 3,000 to 30,000; which has an acid value of 90 mgKOH/g to 200 mgKOH/g; and which is partially or completely neutralized.

18 Claims, 2 Drawing Sheets

(51) Int. Cl.
*C08F 257/00* (2006.01)
*C08F 265/06* (2006.01)
*C08F 265/02* (2006.01)
*C08F 212/06* (2006.01)
*C08F 220/06* (2006.01)
*C08F 293/00* (2006.01)

(56) References Cited

U.S. PATENT DOCUMENTS

| | | | |
|---|---|---|---|
| 5,221,334 | A | 6/1993 | Ma et al. |
| 5,272,201 | A | 12/1993 | Ma et al. |
| 5,609,671 | A | 3/1997 | Nagasawa |
| 5,837,045 | A | 11/1998 | Johnson et al. |
| 7,819,962 | B2 | 10/2010 | Gu |
| 7,922,805 | B2 | 4/2011 | Kowalski et al. |
| 8,016,404 | B2 | 9/2011 | Kato et al. |
| 8,858,695 | B2 | 10/2014 | Gu et al. |
| 9,120,948 | B2 | 9/2015 | Shimanaka et al. |
| 2003/0195274 | A1* | 10/2003 | Nakamura ............ B01J 13/04 523/160 |
| 2006/0201380 | A1 | 9/2006 | Kowalski et al. |
| 2007/0100023 | A1 | 5/2007 | Burns et al. |
| 2007/0100024 | A1 | 5/2007 | Gu et al. |
| 2008/0241398 | A1 | 10/2008 | Kato et al. |
| 2009/0220748 | A1 | 9/2009 | Kanaya et al. |
| 2009/0229489 | A1 | 9/2009 | Gu |
| 2010/0143590 | A1* | 6/2010 | Held ............... C08F 293/005 427/256 |
| 2011/0223529 | A1 | 9/2011 | Shimanaka et al. |
| 2011/0227993 | A1 | 9/2011 | Haijima |
| 2012/0075381 | A1 | 3/2012 | Wachi |
| 2013/0196064 | A1 | 8/2013 | Shimanaka et al. |
| 2013/0235117 | A1 | 9/2013 | Kanaya et al. |
| 2016/0075880 | A1 | 3/2016 | Gu et al. |

FOREIGN PATENT DOCUMENTS

| | | |
|---|---|---|
| EP | 2423272 A2 | 2/2012 |
| JP | H05-179183 A | 7/1993 |
| JP | H08-3498 A | 1/1996 |
| JP | 2000-513396 A | 10/2000 |
| JP | 2006-273892 A | 10/2006 |
| JP | 2008-524400 A | 7/2008 |
| JP | 2008-246821 A | 10/2008 |
| JP | 2009-515007 A | 4/2009 |
| JP | 2011-515535 A | 5/2011 |
| JP | 2014-070184 A | 4/2014 |
| WO | 2010-013651 A1 | 2/2010 |

\* cited by examiner

WATER-BASED INK FOR INK-JET RECORDING AND INK CARTRIDGE

CROSS REFERENCE TO RELATED APPLICATION

The present application claims priority from Japanese Patent Application No. 2015-195501 filed on Sep. 30, 2015, the disclosure of which is incorporated herein by reference in its entirety.

BACKGROUND OF THE INVENTION

Field of the Invention

The present invention relates to a water-based ink for ink-jet recording and an ink cartridge.

Description of the Related Art

Ink-jet recording is conventionally performed by using water-based pigment inks for ink-jet recording in which pigments are used as colorant. Such a water-based pigment ink typically suffers from the problem of rubbing resistance in which a part of the pigment jetted on a recording medium remains on a surface of the recording medium and the remaining pigment peels off from the recording medium when being rubbed by a finger or the like. In order to solve the problem, Japanese Patent Application laid-open No. 2006-273892 corresponding to United States Patent Application Publication Nos. 2009/0220748 and 2013/0235117 discloses an approach in which a polymer is added to the water-based pigment ink to improve the rubbing resistance on the recording medium.

However, adding the polymer to the water-based pigment ink in an excessive amount for the purpose of improving the rubbing resistance may cause the following problem. Namely, when moisture or water in the water-based pigment ink evaporates, the polymer increases the viscosity of the water-based pigment ink to affect maintenance performance. Further, recent ink-jet recording using the water-based ink for ink-jet recording needs higher quality images and higher speed operation. Thus, there is a need for a water-based pigment ink for ink-jet recording which has a good rubbing resistance in recording on glossy paper and which is less likely to cause the unevenness in recording on regular paper.

In view of the above, an object of the present teaching is to provide a water-based pigment ink for ink-jet recording which has a good rubbing resistance in recording on glossy paper and is less likely to cause the unevenness in recording on regular paper.

SUMMARY OF THE INVENTION

According to a first aspect of the present teaching, there is provided a water-based ink for ink-jet recording, including: a pigment; water; oligoethylene glycol monoalkyl ether; and a water-soluble resin, wherein the water-soluble resin is an ABA-type triblock copolymer which has a polymer block A composed only of methyl methacrylate and methacrylic acid and a polymer block B composed only of benzyl methacrylate and methacrylic acid; which has a weight average molecular weight of 3,000 to 30,000; which has an acid value of 90 mgKOH/g to 200 mgKOH/g; and which is partially or completely neutralized.

According to a second aspect of the present teaching, there is provided an ink cartridge which includes the water-based ink for ink-jet recording as defined in the first aspect.

DESCRIPTION OF THE EMBODIMENTS

Figure 1A:
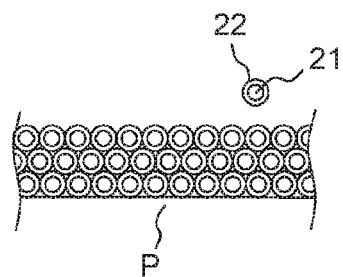
FIGS. 1A to 1C are conceptual views each illustrating an exemplary assumed mechanism about the improvement of rubbing resistance in recording on glossy paper according to the present teaching.

In the present teaching, "glossy paper" means, for example, recording paper in which at least not less than one coating layer(s) is/are formed on its recording surface. The coating layer(s) is/are made of silica particles, alumina particles, or the like. Examples of the glossy paper include photo glossy paper "BP61G" "BP71G" and "BP71GA4" manufactured by BROTHER KOGYO KABUSHIKI KAISHA; ink-jet paper "Kassai" Photo-finish Pro manufactured by FUJI FILM CORPORATION; and highest grade glossy paper "PWRA4-20" manufactured by KODAK JAPAN LTD.

In the present teaching, "regular paper" means recording paper in which any special processing or any special coating treatment is not applied to its recording surface, including, for example, high quality paper to be used for notebooks and report paper sheets and copy paper for which no coating is applied. Examples of the regular paper include "Hammermill (trade name) Laser Print" produced by International Paper Company; "DATE COPY Paper" produced by M-real, "Xerox4200" produced by Xerox Corporation; and "4200DP PAPER" produced by Fuji Xerox Office Supply.

An explanation will be made about a water-based ink for ink-jet recording of the present teaching (hereinafter also referred to as "water-based ink" or "ink" in some cases). The water-based ink for ink-jet recording of the present teaching contains a pigment, a water-soluble organic solvent, water, and a water-soluble resin.

The pigment is not particularly limited and includes, for example, carbon black, inorganic pigment, and organic pigment. The carbon black includes, for example, furnace black, lamp black, acetylene black, and channel black. The inorganic pigment includes, for example, titanium oxide, iron oxide-based inorganic pigment, and carbon black-based inorganic pigment. The organic pigment includes, for example, azo-pigments such as azo lake, insoluble azo-pigment, condensed azo-pigment, and chelate azo-pigment; polycyclic pigments such as phthalocyanine pigment, perylene and pelynon pigments, anthraquinone pigment, quinacridone pigment, dioxadine pigment, thioindigo pigment, isoindolinone pigment, and quinophthalone pigment; dye lake pigments such as basic dye type lake pigment and acid dye type lake pigment; nitro pigments; nitroso pigments; and aniline black daylight fluorescent pigment. Other pigments are also usable provided that the pigments are dispersible in the water phase. The pigments are exemplified, for example, by C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238;

C. I. Pigment Violets 19 and 196; C. I. Pigment Blues 1, 2, 3, 15, 15:1, 15:2, 15:3, 15:4, 16, 22, and 60; C. I. Pigment Greens 7 and 36; and solid solutions of the above-listed pigments. Only one kind of the pigment as described above may be used singly, or two or more kinds of the pigments may be used in combination. The water-based ink of the present teaching may be an ink in which the pigment is dispersed in water with a dispersant. The pigment dispersed in water with the dispersant will be referred to as a "resin dispersible pigment (resin dispersion-type pigment)". Those usable as the dispersant include, for example, commonly used polymeric dispersants (pigment dispersing resins). In the present teaching, the "resin dispersible pigment" does not include any self-dispersible pigment which will be described below.

The pigment may be a self-dispersible pigment. The self-dispersible pigment is dispersible in water without any dispersant, for example, owing to the fact that at least one of the hydrophilic group and the salt thereof including, for example, a carbonyl group, a hydroxyl group, a carboxylic acid group, a sulfonic acid group (sulfonate group), and a phosphoric acid group (phosphate group) is introduced into the surfaces of the pigment particles by the chemical bond directly or with any group intervening therebetween. It is possible to use self-dispersible pigments subjected to the surface treatment by any one of methods described, for example, in Japanese Patent Application Laid-open No. HE18-3498 (corresponding to U.S. Pat. No. 5,609,671), Published Japanese Translation of PCT International Publication for Patent Application No. 2000-513396 (corresponding to U.S. Pat. No. 5,837,045), Published Japanese Translation of PCT International Publication for Patent Application No. 2008-524400 (corresponding to United States Patent Application Publication No. US 2006/0201380), Published Japanese Translation of PCI International Publication for Patent Application No. 2009-515007 (corresponding to United States Patent Application Publications No. US 2007/0100023 and No. US 2007/0100024), and Published Japanese Translation of PCI international Publication for Patent Application No. 2011-515535 (corresponding to United States Patent Application Publication No. US 2009/0229489). It is possible to use, as a material for the self-dispersible pigment, either one of the inorganic pigment and the organic pigment. Further, the pigment suitable for the above-described treatment may be, for example, carbon black such as "MA8" and "MA100" produced by Mitsubishi Chemical Corporation. Those usable as the self-dispersible pigment include, for example, commercially available products. The commercially available products include, for example, "CAB-O-JET (trade name) 200", "CAB-O-JET (trade name) 250C", "CAB-O-JET (trade name) 260M", "CAB-O-JET (trade name) 270Y". "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Corporation; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink SC Holdings Co., Ltd. Only one kind of the self-dispersible pigment as described above may be used singly, or two or more kinds of the self-dispersible pigments may be used in combination.

The solid content blending amount of the pigment (pigment solid content amount) in the entire amount of the water-based ink is not particularly limited, and may be appropriately determined based on desired optical density, color (hue, tint), or the like. The pigment solid content amount is, for example, in a range of 0.1% by weight to 20% by weight, 1% by weight to 15% by weight, or 2% by weight to 10% by weight.

The water-based ink may or may not contain another colorant such as a dye, in addition to the pigment.

The water-soluble organic solvent includes oligoethylene glycol monoalkyl ether (hereinafter referred to as "EO ether"). The water-based ink which contains the EO ether having low surface tension and high permeability is less likely to cause the unevenness in recording on regular paper.

The EO ether contains an alkyl group having, for example, 1 to 6 carbon atoms. The EO ether is exemplified, for example, by diethylene glycol methyl ether, diethylene glycol ethyl ether, diethylene glycol-n-propyl ether, diethylene glycol-n-butyl ether (BDG), diethylene glycol-n-hexyl ether, triethylene glycol methyl ether (MTG), triethylene glycol ethyl ether, triethylene glycol-n-propyl ether, and triethylene glycol-n-butyl ether (BTG). Of the above, it is preferred that BOG and/or BTG each having an alkyl group having 4 carbon atoms be used. Although the polymerization degree of ethylene glycol of the EO ether is not particularly limited, in view of preventing the increase in the viscosity of the water-based ink which would be otherwise caused by adding the EO ether to the water-based ink, the polymerization degree of ethylene glycol is, for example, in a range of 2 to 4. Only one kind of the EO ether as described above may be used singly, or two or more kinds of the EO ether may be used in combination.

The blending amount of the EO ether in the entire amount of the water-based ink is, for example, in a range of 0.2% by weight to 30% by weight, 0.5% by weight to 20% by weight, or 1% by weight to 15% by weight.

The water is preferably ion-exchanged water or pure water (purified water). The blending amount of the water in the entire amount of the water-based ink (the proportion of the water in the water-based ink) is, for example, in a range of 10% by weight to 90% by weight, and preferably in a range of 40% by weight to 80% by weight. The proportion of the water in the water-based ink may be, for example, a balance of the other components.

The water-soluble resin is prepared by neutralizing a part or all of an ABA-type triblock copolymer which has a polymer block A composed only of methyl methacrylate and methacrylic acid and a polymer block B composed only of benzyl methacrylate and methacrylic acid; which has a weight average molecular weight of 3,000 to 30,000; and which has an acid value of 90 mgKOH/g to 200 mgKOH/g.

The water-based ink containing the EO ether and the water-soluble resin has a good rubbing resistance in recording on glossy paper. The mechanism improving the rubbing resistance is assumed, for example, as follows. Adding a copolymer of the methacrylic acid or acrylic acid and a hydrophobic monomer to the water-based ink is a common way to improve the rubbing resistance. However, when the ratio of the hydrophobic monomer in the copolymer is too high, the solubility and the film-forming property of the water-based ink are bad. This reduces rubbing resistance on appearance. To deal with this problem, the EO ether, which has a hydrophobic property equivalent to that of benzyl methacrylate serving as the hydrophobic monomer and a high affinity for the water-soluble resin, is added to the water-based ink to dissolve the water-soluble resin and enhance the film-forming property. Since molecules of the EO ether are smaller than molecules of the water-soluble resin, the molecules of the EO ether efficiently enter the gaps in the molecules of the water-soluble resin. Further, the alkyl group, of the molecules of the EO ether, having a high hydrophobic property interacts with the water-soluble resin to dissolve the water-soluble resin, thereby efficiently enhancing the film-forming property and consequently improving the rubbing resistance.

It is believed that a good rubbing resistance is obtained when the resin added to the water-based ink gets entangled densely on a molecular scale and the resin with a sufficient strength forms a strong film. Here, it is believed that ends of the resin contribute to the entanglement more actively than the center of the resin. Thus, it is preferred that hydrophilic blocks (polymer blocks A), which are easy to flexibly spread in water, be disposed on the ends of the resin which are more likely to contribute to the entanglement and a hydrophobic block (polymer block B) be disposed in the center of the resin which is less likely to contribute to the entanglement, in order to enhance the average strength of the whole molecule. Thus, the water-soluble resin, which is the ABA-type triblock copolymer, improves the rubbing resistance more efficiently than a homopolymer.

Figure 1B:
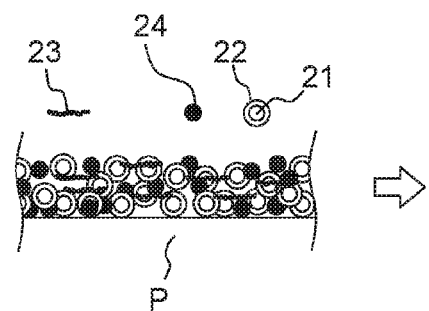
Figure 1C:
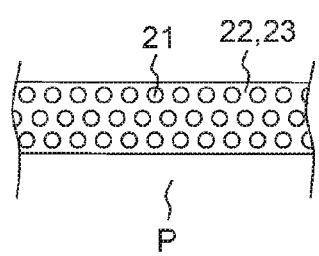

FIGS. 1A to 1C are conceptual diagrams illustrating an exemplary assumed mechanism about the improvement of rubbing resistance in recording on glossy paper by using a resin-dispersible pigment ink which contains the pigment-dispersing resin. As depicted in FIG. 1A, when the water-based ink containing pigment particles 21 covered with a pigment-dispersing resin 22 is discharged or jetted onto glossy paper P, the pigment particles 21 covered with the pigment-dispersing resin 22 remain or stay on the surface of the glossy paper P. If the resin-dispersible pigment ink does not contain the EO-ether and the water-soluble resin of the present teaching, the pigment particles 21 covered with the pigment-dispersing resin 22 and deposited on the glossy paper P can not form a coating film having sufficient strength and the coating film with insufficient strength is easily peeled off by being rubbed softly. On the other hand, as depicted in FIG. 1B, when the resin-dispersible pigment ink contains an EO ether 24 and a water-soluble resin 23 of the present teaching, the EO ether 24 and the water-soluble resin 23 enter the gaps in the pigment particles 21 covered with the pigment-dispersing resin 22. As a result, as depicted in FIG. 1C, the water-soluble resin 23 and the pigment-dispersing resin 22 form a coating film to strongly connect the pigment particles 21 to each other. The rubbing resistance of the resin-dispersible pigment ink in recording on glossy paper is improved, accordingly. It is assumed that the rubbing resistance of a self-dispersible pigment ink in recording on glossy paper is improved by the same mechanism, except that the self-dispersible pigment ink contains no pigment-dispersing resin. Note that FIGS. 1A to 1C are conceptual diagrams, and thus the ratio of the pigment particle size to the size of the water-soluble resin, the number of monomers in the water-soluble resin, and the like differ from actual ones. The same is true on FIGS. 2A and 2B.

Figures 2A, 2B:
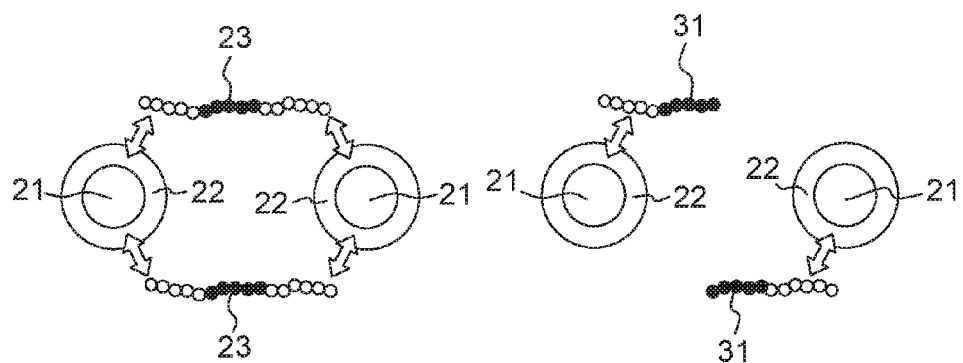
FIGS. 2A and 2B are conceptual views each illustrating an exemplary interaction between a pigment and an ABA-type triblock copolymer according to the present teaching.

FIGS. 2A and 2B are conceptual diagrams illustrating an exemplary interaction between the resin-dispersible pigment and the water-soluble resin of the present teaching. As depicted in FIG. 2A, the water-soluble resin 23 having a structure in which the hydrophobic polymer block B is sandwiched by two hydrophilic polymer blocks A has a larger interaction with the pigment-dispersing resin 22 covering each pigment particle 21 than an AB-type diblock copolymer 31 depicted in FIG. 2B. Thus, it is believed that the connection between pigment particles 21 by using the water-soluble resin 23 is stronger than the connection between pigment particles 21 by using the AB-type diblock copolymer 31. The self-dispersible pigment ink is also expected to have the strong connection between pigment particles 21 by the same mechanism, except that the pigment-dispersing resin 22 is replaced by a hydrophilic group introduced into the pigment. Considering the effect of entanglement of pigment-dispersing resin, the connection between pigment particles 21 covered with the pigment-dispersing resin 22 may be stronger than the connection between pigment particles 21 into which the hydrophilic group is introduced.

All of the mechanisms are just assumptions, and the present teaching is not limited thereto.

The weight average molecular weight of the ABA-type triblock copolymer is in a range of 3,000 to 30,000, for example, 6,500 to 30,000, or 8,000 to 15,000. The ABA-type triblock copolymer has only to have such a configuration that one polymer block B is sandwiched by two polymer blocks A. The ratio of the weight average molecular weight of each polymer block A to the weight average molecular weight of the polymer block B is not particularly limited. The ratio may be, for example, A:B:A=1:1:1, or any other ratio is also allowable. The ratio of the weight average molecular weight of the polymer block A to the weight average molecular weight of the polymer block B is, for example, (A/B)=0.2 to 8, preferably 0.5 to 2. Making the weight average molecular weights of the polymer blocks A, B within the above ranges optimizes the solubility of the ABA-type triblock copolymer to water and the strength of the ABA-type triblock copolymer. It is preferred that the two polymer blocks A at both ends of each water-soluble resin molecule have substantially the same weight average molecular weight. The weight average molecular weight can be measured, for example, in accordance with JISK0124.

The acid value of the ABA-type triblock copolymer is in a range of 90 mgKOH/g to 200 mgKOH/g, for example, 100 mgKOH/g to 200 mgKOH/g or 100 mgKOH/g to 150 mgKOH/g. The acid value can be measured, for example, in accordance with JISK0070.

Each polymer block A of the ABA-type triblock copolymer is a random copolymer composed only of methyl methacrylate and methacrylic acid. The weight ratio of the methyl methacrylate to the methacrylic acid is, for example, (methyl methacrylate)/(methacrylic acid)=0.2 to 4.5, preferably 1.7 to 3.8. The polymer block B of the ABA-type triblock copolymer is a random copolymer composed only of benzyl methacrylate and methacrylic acid. The weight ratio of the benzyl methacrylate to the methacrylic acid is, for example, (benzyl methacrylate)/(methacrylic acid)=0.8 to 65.0, preferably 3.8 to 32.0. In the ABA-type triblock copolymer, each polymer block A is hydrophilic and the polymer block B is hydrophobic. When the polymer blocks A, B contain monomers so that their weight ratios are within the above ranges, it is possible to obtain the well balance between the hydrophilic property of each polymer block A and the hydrophobic property of the polymer block B.

The water-soluble resin is prepared by neutralizing a part or all of the ABA-type triblock copolymer. In particular, a part or all of the methacrylic acid in the ABA-type triblock copolymer is neutralized by a neutralizer which is a base. The neutralization improves the solubility of the water-soluble resin. Although the neutralizer is not particularly limited, it is preferred that potassium hydroxide be used in view of solubility of a salt formed with the neutralizer.

The water-soluble resin may be prepared, for example, privately or independently, or any commercially available product may be used for the water-soluble resin. The water-soluble resin may be prepared, for example, by a step-bystep polymerization method. The step-by-step polymerization method is exemplified, for example, by an anion polymerization method or a group transfer polymerization method described in U.S. Pat. No. 4,508,880. In the group transfer polymerization method, an initiator may be non-functional, may contain an acid group, or may contain an amino group. Further, the water-soluble resin may be prepared, for example, by an anion polymerization method or a group transfer polymerization method in which one of the two polymer blocks A is polymerized first, the polymer block B is polymerized second, and the other of the two polymer blocks A is polymerized last. A specific example of the preparation method of the water-soluble resin will be explained, for example, in EXAMPLES as described later. The above preparation methods, however, are merely examples, and the water-soluble resin may be prepared by any other method.

The blending amount of the water-soluble resin in the entire amount of the water-based ink is, for example, in a range of 0.1% by weight to 10% by weight, 0.25% by weight to 5% by weight, or 0.5% by weight to 2,5% by weight.

It is preferred that the water-soluble organic solvent further contain oligopropylene glycol (hereinafter referred to as "PO diol"). The PO diol, which has a hydrophobic property lower than that of the EO ether and a high water-retaining property derived from hydroxyl groups in molecules, further improves the rubbing resistance of the water-based ink in recording on glossy paper while maintaining a re-dispersion property of the water-based ink after moisture or water evaporation. In view of the improvement of rubbing resistance in recording on glossy paper and the solubility in water, the polymerization degree of propylene glycol of the PO diol is, for example, in a range of 2 to 4.

The PO diol is exemplified, for example, by dipropylene glycol (DPG) and tripropylene glycol (TPG), and TPG is preferably used. Only one kind of the PO diol as described above may be used singly, or two or more kinds of the PO diol may be used in combination.

The blending amount of the PO diol in the entire amount of the water-based ink is, for example, in a range of 0.2% by weight to 30% by weight, 0.5% by weight to 20% by weight, or 1% by weight to 15% by weight.

The weight ratio between the EO ether (E) and the PO diol in the water-based ink is, for example, E:P=20:1 to 1:20, 10:1 to 1:10, or 1:4 to 4:1. Namely, the weight ratio (E/P) of the blending amount (E) of the EO ether in the water-based ink to the blending amount (P) of the PO diol (P) in the water-based ink is, for example, 0.05 to 20, 0.1 to 10, or 0.25 to 4. Making the weight ratio (E/P) within the above ranges results in the water-based ink for ink-jet recording of the present teaching which has a better rubbing resistance in recording on glossy paper and a better re-dispersion property and which is much less likely to cause the unevenness in recording on regular paper.

The weight ratio (E/R) of the blending amount (E) of the EO ether in the water-based ink to the blending amount (R) of the water-soluble resin in the water-based ink is preferably 1 to 25. Making the weight ratio (E/R) within the above ranges results in the water-based ink for ink-jet recording of the present teaching which has a better rubbing resistance in recording on glossy paper and is much less likely to cause the unevenness in recording on regular paper.

The weight ratio ((E+P)/R) of the total blending amount (E+P) of the EO ether and the PO diol in the water-based ink to the blending amount (R) of the water-soluble resin in the water-based ink is preferably 4 to 50, Making the weight ratio ((E+P)/R) within the above ranges results in the water-based ink for ink-jet recording of the present teaching which has a better rubbing resistance in recording on glossy paper and a better re-dispersion property and which is much less likely to cause the unevenness in recording on regular paper.

The weight ratio (R/Pig) of the blending amount (R) of the water-soluble resin in the water-based ink to the blending amount (Pig) of the pigment in the water-based ink is preferably 0.04 to 0.5. Making the weight ratio (R/Pig) within the above ranges results in the water-based ink for ink-jet recording of the present teaching which has a better rubbing resistance in recording on glossy paper and which is much less likely to cause the unevenness in recording on regular paper.

The water-based ink may contain any other water-soluble organic solvent than the EO ether and the PO diol, such as a humectant which prevents the water-based ink from drying at an end of a nozzle in an ink-jet head and a penetrant which adjusts the drying velocity on a recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers of polyalkylene glycol except for the PO diol; polyvalent alcohols such as alkylene glycol except for the PO diol, glycerol, trimethylolpropane, and trimethylolethane; 2-pyrrolidone; N-methyl-2-pyrrolidone; and 1,3-dimethyl-2-imidazolidinone. The polyalkylene glycol except for the PO diol is exemplified, for example, by polyethylene glycol. The alkylene glycol except for the PO diol is exemplified, for example, by ethylene glycol, propylene glycol, butylene glycol, diethylene glycol, triethylene glycol, thiodiglycol, and hexylene glycol. Only one kind of the humectant as described above may be used singly, or two or more kinds of the humectants may be used in combination. Among the above-described humectants, it is preferred that polyvalent alcohols such as alkylene glycol except for the PO diol and glycerol be used.

The blending amount of the humectant in the entire amount of the water-based ink is, for example, in a range of 0% by weight to 95% by weight, 5% by weight to 80% by weight, or 5% by weight to 50% by weight.

The penetrant includes, for example, glycol ether except for the EO ether. The glycol ether except for the EO ether is exemplified, for example, by ethylene glycol methyl ether, ethylene glycol ethyl ether, ethylene glycol-n-propyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One kind of the penetrant may be used singly, or two or more kinds of the penetrants may be used in combination.

The blending amount of the penetrant in the entire amount of the water-based ink is, for example, in a range of 0% by weight to 20% by weight, 0% by weight to 15% by weight, or 1% by weight to 4% by weight.

The water-based ink may further contain a conventionally known additive, as necessary. The additive includes, for example, surfactants, pH-adjusting agents, viscosity-adjusting agents, surface tension-adjusting agents, and fungicides. The viscosity-adjusting agents include, for example, polyvinyl alcohol, cellulose, and water-soluble resin.

The water-based ink can be prepared, for example, such that the pigment, the EO ether, the water-soluble resin, water, and optionally other additive component(s) are mixed uniformly or homogeneously by any conventionally known method, and undissolved matters are removed by a filter or the like.

The water-based ink for ink-jet recording of the present teaching, which contains the pigment, oligoethylene glycol monoalkyl ether, and the water-soluble resin, has a good rubbing resistance in recording on glossy paper and is less likely to cause the unevenness in recording on regular paper.

Next, the ink cartridge of the present teaching is characterized by being an ink cartridge containing a water-based ink for ink-jet recording; wherein the water-based ink for ink-jet recording is the water-based ink for ink-jet recording of the present teaching. For example, any conventionally known main body (body) of an ink cartridge can be used for the main body of the ink cartridge of the present teaching.

Next, an explanation will be given about an ink-jet recording apparatus and an ink-jet recording method of the present teaching.

The ink-jet recording apparatus of the present teaching is an ink-jet recording apparatus characterized by including: an ink accommodating section configured to accommodate an ink therein; and an ink discharge mechanism configured to discharge the ink accommodated in the ink accommodating section; wherein the ink accommodated in the ink accommodating section is the water-based ink for ink-jet recording of the present teaching.

The ink-jet recording method of the present teaching is an ink-jet recording method characterized by including: performing recording on a recording medium by discharging, to the recording medium, a water-based ink by an ink-jet system; and using the water-based ink for ink-jet recording of the present teaching, as the water-based ink.

The ink-jet recording method of the present teaching can be practiced, for example, by using the ink-jet recording apparatus of the present teaching. The recording includes, for example, printing a letter (text), printing an image, and printing.

Figure 3:
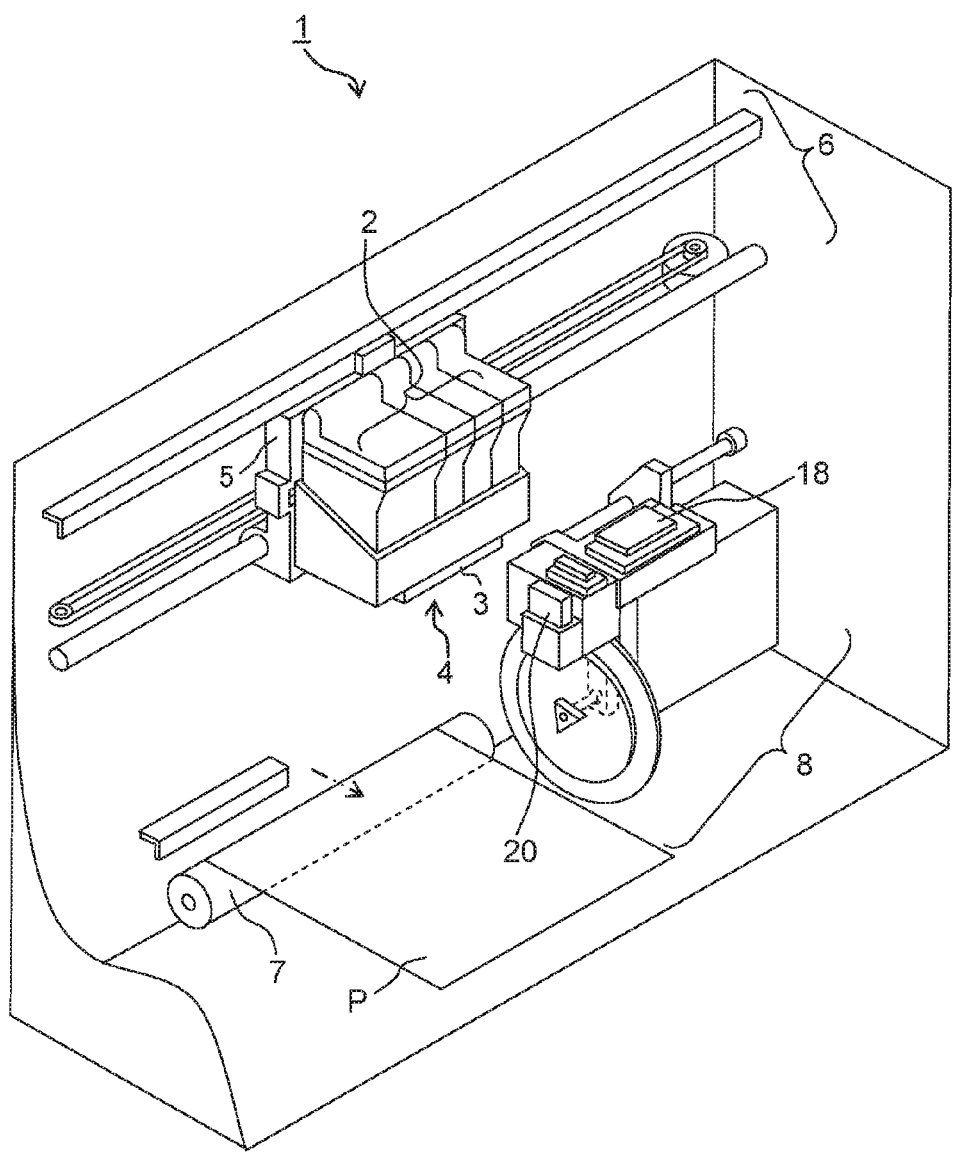
FIG. 3 is a schematic perspective view of an exemplary configuration of an ink-jet recording apparatus of the present teaching.

FIG. 3 depicts an exemplary configuration of the ink-jet recording apparatus of the present teaching. As depicted in FIG. 3, an ink-jet recording apparatus 1 of the present teaching includes four ink cartridges 2, an ink discharge mechanism (ink-jet head) 3, a head unit 4, a carriage 5, a driving unit 6, a platen roller 7 and a purge device 8 as main constitutive components or parts, The four ink cartridges 2 contain four colors of water-based inks, respectively, the four colors being yellow, magenta, cyan and black. At least one water-based ink among the four color water-based inks is the water-based ink for ink-jet recording of the present teaching. The ink-jet head 3 disposed on the head unit 4 performs recording on a recording medium P (for example, a recording sheet such as glossy paper, regular paper, or the like). The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No 2008-246821 corresponding to United States Patent Application Publication No. US2008/0241398). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the inside of the ink-jet head 3. As the purge device 8, it is possible to use, for example, a conventionally known purge device (see, for example, Japanese Patent Application laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 3, a cap 18 is provided to cover a plurality of nozzles of the ink-jet head 3 which is returned to a reset position upon completion of the recording, so as to prevent the water-based inks from drying.

In the ink-jet recording apparatus 1 of this embodiment, the four ink cartridges 2 are provided, together with the head unit 4, on one carriage 5. However, the present teaching is not limited to this. In the ink-jet recording apparatus 1, the respective four cartridges 2 may be provided on a carriage which is different (separate) from the carriage on which the head unit 4 is provided. Alternatively, the respective four cartridges 2 may be arranged and fixed inside the ink-jet recording apparatus 1, rather than being provided on the carriage 5. In such aspects, for example, each of the four cartridges 2 and the head unit 4 which is provided on the carriage 5 are connected with a tube, etc., and the water-based inks are supplied from the four cartridges 2, respectively, to the head unit 4 via the tubes.

Ink-jet recording using the ink-jet recording apparatus 1 is performed, for example, in the following manner. Namely, at first, a recording paper P is supplied or fed from a feed cassette (not depicted in the drawing) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. The recording paper P after the recording is discharged from the ink-jet recording apparatus 1. According to the present teaching, a recorded matter having a good rubbing resistance can be obtained in recording on glossy paper, and a recorded matter in which unevenness is prevented can be obtained in recording on regular paper. In FIG. 3, illustration of the teed mechanism and discharge mechanism for the recording paper P is omitted.

In the apparatus depicted in FIG. 3, an ink-jet head of serial type (serial type ink-jet head) is adopted. However, the present teaching is not limited to this. The ink-jet recording apparatus may be an apparatus adopting an ink-jet head of line type (line type ink-jet head).

EXAMPLES

Next, examples of the present teaching will be explained together with comparative examples. Note that the present teaching is not limited and is not restricted to the examples and the comparative examples which will be described below.

<Preparation of Water-Soluble Resin>

The water-soluble resin was synthesized by a living radical polymerization technique. 2-iodo-2-cyanopropane, azobisisobutyronitrile, iodosuccinimide, methyl methacrylate, and methacrylic acid were added to diethylene glycol dimethyl ether under a nitrogen atmosphere, and the temperature of this mixture was raised, thereby promoting and completing the polymerization reaction. Next, a mixture of benzyl methacrylate and methacrylic acid was added and polymerized. After that, a mixture of methyl methacrylate and methacrylic acid was added and polymerized. Accordingly, an ABA-type triblock copolymer was obtained. Further, the aqueous solution of the water-soluble resin 1 indicated in TABLES 1 to 5 in which the weight average molecular weight was 10,000 and the acid value was 130 mgKOH/g was obtained by distilling off diethylene glycol dimethyl ether under reduced pressure and adding purified water and potassium hydroxide. The aqueous solutions of water-soluble resins 2 to 5 indicated in TABLE 3 were obtained in a similar manner as the aqueous solution of the water-soluble resin 1, except that the polymerization temperature, polymerization solvent, initiator, monomer composition, radical generator, catalyst, neutralizer, and polymerization time were changed appropriately. The monomer weight ratios of the water-soluble resins 1 to 5 (methyl methacrylate/methacrylic acid//benzyl methacrylate/methacrylic acid//methyl methacrylate /methacrylic acid) are indicated as follows. Two slashes mean separation between blocks and one slash means a random copolymer.

Water-Soluble Resin 1
0.2.5/0.09//0.31/0.03//0.2.5/0.09
Water-Soluble Resin 2
0.26/0.07//0.32/0.01//0.26/0.07
Water-Soluble Resin 3
0.21/0.12//0.27/0.07//0.21/0.12
Water-Soluble Resin 4
0.25/0.09//0.31/0.03//0.25/0.09
Water-Soluble Resin 5
0.25/0.09//0.31/0.03//0.25/0.09

<Preparation of Random Copolymer>

The random copolymer was synthesized similarly to the water-soluble resin by the living radical technique, except that the methyl methacrylate, methacrylic acid, and benzyl methacrylate were mixed all together. Further, the aqueous solution of the random copolymer indicated in TABLE 3 in which the weight average molecular weight was 10,000 and the acid value was 130 mgKOH/g was obtained by distilling off diethylene glycol dimethyl ether under reduced pressure and adding purified water and potassium hydroxide. The monomer weight ratio of the random copolymer (methyl methacrylate/methacrylic acid/benzyl methacrylate) is indicated as follows. One slash means a random copolymer.

Random Copolymer
0.49/0.17/0.31

<Preparation of Pigment Dispersion Liquids 1, 2>

Purified water was added to 20% by weight of a pigment (C.I. pigment red 122) and 7% by weight of a sodium hydroxide neutralized product of a styrene-acrylic acid copolymer (acid value 175, molecular weight 10,000) so that the sum of them was 100% by weight, followed by being stirred (agitated) and mixed with each other. This mixture was put in a wet sand mill using zirconia beads with a diameter of 0.3 mm as a medium to perform dispersion treatment for six hours. After that, the zirconia beads were removed by a separator, and the mixture thus obtained was filtrated through a cellulose acetate filter (pore size 3.00 μm). The pigment dispersion liquid 1 was obtained, accordingly. The styrene-acrylic acid copolymer is a water-soluble polymer commonly used as the pigment dispersant. The pigment dispersion liquid 2 indicated in TABLE 5 was obtained similarly to the pigment dispersion liquid 1, except that the type of pigment, the ratio of components, and the dispersion treatment time were changed appropriately.

Examples 1-1 to 1-3 and Comparative Example 1-1

Examples 1-1 to 1-3 were examples using mutually different kinds of EO ether. Components, except for the pigment dispersion liquid 1, which were included in Ink composition (TABLE 1) were mixed uniformly or homogeneously; and thus an ink solvent was obtained. Subsequently, the aqueous solution of the water-soluble resin and the ink solvent were added to the pigment dispersion liquid 1, followed by being mixed uniformly. After that, the obtained mixture was filtrated through a cellulose acetate membrane filter (pore size 3.00 μm) produced by Toyo Roshi Kaisha, Ltd., and thus the water-based ink for ink-jet recording of each of Examples 1-1 to 1-3 and Comparative Example 1-1 was obtained.

Regarding the water-based inks of Examples 1-1 to 1-3 and Comparative Example 1-1, (a) the evaluation of rubbing resistance in recording on glossy paper, (b) the evaluation of unevenness in recording on regular paper, and (c) the evaluation of re-dispersion were performed by the following methods.

(a) Evaluation of Rubbing Resistance in Recording on Glossy Paper

A digital multi-function peripheral equipped with an ink-jet printer "MFC-J4510N" manufactured by BROTHER KOGYO KABUSHIKI KAISHA was used to record an image including a single color patch on glossy paper (photo glossy paper "BP71GA4", exclusive or dedicated paper manufactured by BROTHER KOGYO KABUSHIKI KAISHA), with a resolution of 1200 dpi×2400 dpi, by using each of the water-based inks of Examples 1-1 to 1-3 and Comparative Example 1-1. Thus, evaluation samples were produced. Each of the evaluation samples was rubbed with a rubber glove to which a constant load of $8\times10^3$ Pa was applied at predetermined time intervals. The rubbing-off on and around the rubbed part was observed visually in accordance with the following evaluation criteria. In the following evaluation criteria, "dirt" means color staining of the water-based ink which is caused by the water-based ink spreading over a non-recorded part of the glossy paper, and "rubbing-off" means a scratch (damage caused by rubbing) caused in a recorded pail of the glossy paper.

<Evaluation Criteria for Evaluation of Rubbing Resistance in Recording on Glossy Paper>

AA: When the evaluation sample was rubbed after the elapse of one minute from its manufacture, no dirt and no rubbing-off were caused on and around the rubbed part.

A: When the evaluation sample was rubbed after the elapse of two minutes from its manufacture, no dirt and no rubbing-off were caused on and around the rubbed part.

A–: When the evaluation sample was rubbed after the elapse of three minutes from its manufacture, no dirt and no rubbing-off were caused on and around the rubbed part.

B: When the evaluation sample was rubbed after the elapse of three minutes from its manufacture, dirt and rubbing-off were caused on and around the rubbed part.

(b) Evaluation of unevenness in recording on regular paper

The digital multi-function peripheral equipped with the ink-jet printer "MFC-J4510N" was used to record an image including a single color patch on regular paper (high quality regular paper "BP60PA", exclusive or dedicated A4 paper manufactured by BROTHER KOGYO KABUSHIKI KAISHA), with a resolution of 600 dpi×300 dpi, by using each of the water-based inks of Examples 1-1 to 1-3 and Comparative Example 1-1. Then, the unevenness in each of the regular papers was evaluated by visually determining whether the single color patch was most similar to which one of three kinds of criteria samples prepared in advance and identified as "AA", "A" d "B" in a descending order of satisfaction.

(c) Evaluation of Re-Dispersion Property

Each of the water-based inks of Examples 1-1 to 1-3 and Comparative Example 1-1 was dripped in an amount of 2 μL onto a glass slide. Subsequently, each of the glass slides was stored overnight under an environment of temperature 80° C., and thus each of the water-based inks was evaporated and dried. Next, three drops of water was dripped onto each of the evaporated and dried solid matters by use of a dropper. Each of the evaluation samples prepared in such a manner was observed visually, and the re-dispersion property: was evaluated in accordance with the following evaluation criteria.

<Evaluation Criteria for Evaluation of Re-Dispersion Property>

A: The solid matter was uniformly dispersed, and no undissolved agglomeration was observed.

A–: The solid matter was almost uniformly dispersed, but an undissolved agglomeration was partially observed.

C: The solid matter was not dispersed.

TABLE 1 shows the ink compositions and the evaluation results for the water-based inks of Examples 1-1 to 1-3 and Comparative Example 1-1.

which no EO ether was used had bad evaluation results of the rubbing resistance in recording on glossy paper and the unevenness in recording on regular paper.

Examples 2-1 and 2-2 and Comparative Example 2-1

Examples 2-1 and 2-2 were examples further containing the PO diol. Components, except for the pigment dispersion liquid 1, which were included in Ink composition (TABLE 2) were mixed uniformly or homogeneously; and thus an ink solvent was obtained. Subsequently, the aqueous solution of the water-soluble resin and the ink solvent were added to the pigment dispersion liquid 1, followed by being mixed uniformly. After that, the obtained mixture was filtrated through a cellulose acetate membrane filter (pore size 3.00 μm) produced by Toyo Roshi Kaisha, Ltd., and thus the water-based ink for inkjet recording of each of Examples 2-1 and 2-2 and Comparative Example 2-1 was obtained.

Regarding the water-based inks of Examples 2-1 and 2-2 and Comparative Example 2-1, the evaluation of rubbing resistance in recording on glossy paper, the evaluation of

TABLE 1

|  |  |  |  | Examples |  | Comparative Example |
|---|---|---|---|---|---|---|
|  |  |  | 1-1 | 1-2 | 1-3 | 1-1 |
| Ink composition (% by weight) | Pigment dispersion liquid 1 (*1) |  | 5.00 | 5.00 | 5.00 | 5.00 |
|  | BTG |  | 5.00 | — | — | — |
|  | MTG |  | — | 5.00 | — | — |
|  | BDG |  | — | — | 5.00 | — |
|  |  | Weight average molecular weight | Acid value mg KHO/g |  |  |  |
|  | Water-soluble resin 1 | 10,000 | 130 | 1.00 | 1.00 | 1.00 | 1.00 |
|  | SUNNOL (trade name) NL1430 (*2) |  | 3.00 | 3.00 | 3.00 | 3.00 |
|  | 85% Glycerol |  | 20.00 | 20.00 | 20.00 | 20.00 |
|  | Water |  | balance | balance | balance | balance |
| Rubbing resistance in recording on glossy paper |  |  | A– | A– | A– | B |
| Unevenness in recording on regular paper |  |  | AA | A | AA | B |
| Re-dispersion property |  |  | A | A | A | A |

TABLE 1 (following)—LEGEND
(*1): C.I. pigment red 122 dispersion liquid containing 1.75% by weight of pigment dispersing resin
(*2): Anionic surfactant; produced by LION SPECIALITY CHEMICALS CO., LTD. Regarding numerals in TABLE 1, those of the pigment dispersion liquid and the water-soluble resin indicate solid content amounts and that of the surfactant indicates the active ingredient.

As shown in TABLE 1, Examples 1-1 to 1-3 had good evaluation results of the rubbing resistance in recording on glossy paper, the unevenness in recording on regular paper, and the re-dispersion property. Especially, Examples 1-1 and 1-3, in which BTG or BDG containing the alkyl group having four carbon atoms was used as the EO ether, had very good evaluation results of the unevenness in recording on regular paper. Meanwhile, Comparative Example 1-1 in unevenness in recording on regular paper, and the evaluation of re-dispersion property were performed similarly to Examples 1-1 to 1-3 and Comparative Example 1-1.

TABLE 2 shows the ink compositions and the evaluation results for the water-based inks of Examples 2-1 and 2-2 and Comparative Example 2-1. Note that TABLE 2 also shows the water-based ink composition and the evaluation result for the water-based ink of Example 1-1.

TABLE 2

|  |  |  | Examples |  |  | Comparative Example |
|---|---|---|---|---|---|---|
|  |  |  | 1-1 | 2-1 | 2-2 | 2-1 |
| Ink Composition (% by weight) | Pigment dispersion liquid 1 (*1) |  | 5.00 | 5.00 | 5.00 | 5.00 |
|  | BTG |  | 5.00 | 5.00 | 5.00 | — |
|  | TPG |  | — | — | 5.00 | 5.00 |
|  | DPG |  | — | 5.00 | — | — |
|  | Weight average molecular weight | Acid value mg KHO/g |  |  |  |  |

TABLE 2-continued

|  |  |  |  | Examples |  | Comparative Example |
|---|---|---|---|---|---|---|
|  |  |  | 1-1 | 2-1 | 2-2 | 2-1 |
| Water-soluble resin 1 | 10,000 | 130 | 1.00 | 1.00 | 1.00 | 1.00 |
| SUNNOL (trade name) NL1430 (*2) |  |  | 3.00 | 3.00 | 3.00 | 3.00 |
| 85% Glycerol |  |  | 20.00 | 20.00 | 20.00 | 20.00 |
| Water |  |  | balance | balance | balance | balance |
| EO ether:PO diol (E:P) |  |  | 1:1 | 1:1 | 1:1 | — |
| Rubbing resistance in recording on glossy paper |  |  | A− | A | AA | A− |
| Unevenness in recording on regular paper |  |  | AA | AA | AA | B |
| Re-dispersion property |  |  | A | A | A | A |

TABLE 2 (following)—LEGEND
(*1): C.I. pigment red 122 dispersion liquid containing 1.75% by weight of pigment dispersing resin
(*2): Anionic surfactant; produced by LION SPECIALITY CHEMICALS CO., LTD. Regarding numerals in TABLE 2, those of the pigment dispersion liquid and the water-soluble resin indicate solid content amounts and that of the surfactant indicates the active ingredient.

As shown in TABLE 2, Examples 2-1 and 2-2, in which DPG or TPG was used as the PO diol, had evaluation results of the unevenness in recording on regular paper and the re-dispersion property which were equivalent to those of Example 1-1, Examples 2-1 and 2-2 had evaluation results of the rubbing resistance in recording on glossy paper which were better than that of Example 1-1. Especially, Example 2-2, in which TPG was used as the PO diol, had a very good evaluation result of the rubbing resistance in recording on glossy paper. Comparative Example 2-I, in which the PO diol was used and no EO ether was used, had a bad evaluation result of the unevenness in recording on regular paper.

Examples 3-1 to 3-4 and Comparative Examples 3-1 and 3-2

Examples 3-1 to 3-4 were examples further containing the PO diol and using mutually different water-soluble resins. Components, except for the pigment dispersion liquid 1, which were included in Ink composition (TABLE 3) were mixed uniformly or homogeneously; and thus an ink solvent was obtained. Subsequently, the aqueous solution of the water-soluble resin and the ink solvent were added to the pigment dispersion liquid 1, followed by being mixed uniformly. After that, the obtained mixture was filtrated through a cellulose acetate membrane filter (pore size 3.00 μm) produced by Toyo Roshi Kaisha, Ltd., and thus the water-based ink for ink-jet recording of each of Examples 3-1 to 3-4 and Comparative Examples 3-1 and 3-2 was obtained.

Regarding the water-based inks of Examples 3-1 to 3-4 and Comparative Examples 3-1 and 3-2, the evaluation of rubbing resistance in recording on glossy paper, the evaluation of unevenness in recording on regular paper, and the evaluation of re-dispersion property were performed similarly to Examples 1-1 to 1-3 and Comparative Example 1-1.

TABLE 3 shows the water-based ink compositions and the evaluation results for the water-based inks of Examples 3-1 to 3-4 and Comparative Examples 3-1 and 3-2. Note that TABLE 3 also shows the water-based ink composition and the evaluation result for the water-based ink of Example 2-2.

TABLE 3

|  |  |  |  | Examples |  |  |  |  | Comparative Examples |  |
|---|---|---|---|---|---|---|---|---|---|---|
|  |  |  |  | 2-2 | 3-1 | 3-2 | 3-3 | 3-4 | 3-1 | 3-2 |
| Ink Composition (% by weight) | Pigment dispersion liquid 1 (*1) |  |  | 5.00 | 5.00 | 5.00 | 5.00 | 5.00 | 5.00 | 5.00 |
|  | BTG |  |  | 5.00 | 5.00 | 5.00 | 5.00 | 5.00 | 5.00 | 5.00 |
|  | TPG |  |  | 5.00 | 5.00 | 5.00 | 5.00 | 5.00 | — | — |
|  |  | Weight average molecular weight | Acid value mg KHO/g |  |  |  |  |  |  |  |
|  | Water-soluble resin 1 | 10,000 | 130 | 1.00 | — | — | — | — | — | — |
|  | Water-soluble resin 2 | 10,000 | 100 | — | 1.00 | — | — | — | — | — |
|  | Water-soluble resin 3 | 10,000 | 200 | — | — | 1.00 | — | — | — | — |
|  | Water-soluble resin 4 | 6,500 | 130 | — | — | — | — | 1.00 | — | — |
|  | Water-soluble resin 5 | 30,000 | 130 | — | — | — | — | 1.00 | — | — |

TABLE 3-continued

|  |  | Examples | | | | | Comparative Examples | |
|---|---|---|---|---|---|---|---|---|
|  |  | 2-2 | 3-1 | 3-2 | 3-3 | 3-4 | 3-1 | 3-2 |
| Random copolymer | 10,000  130 | — | — | — | — | — | 1.00 | — |
| AQUALIC (trade name) DL-345 (*3) | | — | — | — | — | — | — | 1.00 |
| SUNNOL (trade name) NL1430 (*2) | | 3.00 | 3.00 | 3.00 | 3.00 | 3.00 | 3.00 | 3.00 |
| 85% Glycerol | | 20.00 | 20.00 | 20.00 | 20.00 | 20.00 | 20.00 | 20.00 |
| Water | | balance | balance | balance | balance | balance | balance | balance |
| EO ether:PO diol (E:P) | | 1:1 | 1:1 | 1:1 | 1:1 | 1:1 | — | — |
| Rubbing resistance in recording on glossy paper | | AA | AA | AA | AA | AA | B | B |
| Unevenness in recording, on regular paper | | AA | AA | AA | AA | AA | AA | AA |
| Re-dispersion property | | A | A | A | A | A | A | A |

TABLE 3 (following)—LEGEND
(*1): C.I. pigment red 122 dispersion liquid containing 1.75% by weight of pigment dispersing resin
(*2): Anionic surfactant; produced by LION SPECIALITY CHEMICALS CO., LTD.
(*3): Polyacrylic acid; produced by NIPPON SHOKUBAI CO., LTD. Regarding numerals in TABLE 3, those of the pigment dispersion liquid and the water-soluble resin indicate solid content amounts and that of the surfactant indicates the active ingredient.

As shown in TABLE 3, Examples 3-1 to 3-4 had evaluation results of the rubbing resistance in recording on glossy paper, the unevenness in recording on regular paper, and the re-dispersion property which were equivalent to the evaluation results of Example 2-2. Comparative Examples 3-1 and 3-2, in which the random copolymer or the polyacylic acid was used instead of the water-soluble resin, had bad evaluation results of the rubbing resistance in recording on glossy paper.

Examples 4-1 to 4-6

Examples 4-1 to 4-6 were examples further containing the PO diol and adopting mutually different weight ratios (E:P). Components, except for the pigment dispersion liquid 1, which were included in Ink composition (TABLE 4) were mixed uniformly or homogeneously; and thus an ink solvent was obtained. Subsequently, the aqueous solution of the water-soluble resin and the ink solvent were added to the pigment dispersion liquid 1, followed by being mixed uniformly. After that, the obtained mixture was filtrated through a cellulose acetate membrane filter (pore size 3.00 μm) produced by Toyo Roshi Kaisha, Ltd., and thus the water-based ink for ink-jet recording of each of Examples 4-1 to 4-6 was obtained.

Regarding the water-based inks of Examples 4-1 to 4-6, the evaluation of rubbing resistance in recording on glossy paper, the evaluation of unevenness in recording on regular paper, and the evaluation of re-dispersion property were performed similarly to Examples 1-1 to 1-3 and Comparative Example 1-1.

TABLE 4 shows the water-based ink compositions and the evaluation results for the water-based inks of Examples 4-1 to 4-6. Note that TABLE 4 also shows the water-based ink composition and the evaluation result for the water-based ink of Example 2-2.

TABLE 4

|  |  |  | Examples | | | | | | |
|---|---|---|---|---|---|---|---|---|---|
|  |  |  | 2-2 | 4-1 | 4-2 | 4-3 | 4-4 | 4-5 | 4-6 |
| Ink Composition (% by weight) | Pigment dispersion liquid 1 (*1) | | 5.00 | 5.00 | 5.00 | 5.00 | 5.00 | 5.00 | 5.00 |
| | BTG | | 5.00 | 1.00 | 1.00 | 2.00 | 8.00 | 10.00 | 10.00 |
| | TPG | | 5.00 | 10.00 | 5.00 | 8.00 | 2.00 | 2.00 | 1.00 |
| | | Weight average molecular weight | Acid value mg KHO/g | | | | | | |
| | Water-soluble resin 1 | 10,000  130 | 1.00 | 1.00 | 1.00 | 1.00 | 1.00 | 1.00 | 1.00 |
| | SUNNOL (trade name) NL1430 (*2) | | 3.00 | 3.00 | 3.00 | 3.00 | 3.00 | 3.00 | 3.00 |
| | 85% Glycerol | | 20.00 | 20.00 | 20.00 | 20.00 | 20.00 | 20.00 | 20.00 |
| | Water | | balance | balance | balance | balance | balance | balance | balance |
| | EO ether:PO diol (E:P) | | 1:1 | 1:10 | 1:5 | 1:4 | 4:1 | 5:1 | 10:1 |
| Rubbing resistance in recording on glossy paper | | | AA | A | A | AA | AA | AA | AA |
| Unevenness in recording on regular paper | | | AA | A | A | AA | AA | AA | AA |
| Re-dispersion property | | | A | A | A | A | A | A- | A- |

TABLE 4 (following)—LEGEND
(*1): C.I. pigment red 122 dispersion liquid containing 1.75% by weight of pigment dispersing resin
(*2): Anionic surfactant; produced by LION SPECIALITY CHEMICALS CO., LTD. Regarding numerals in TABLE 4, those of the pigment dispersion liquid and the water-soluble resin indicate solid content amounts and that of the surfactant indicates the active ingredient.

As shown in TABLE 4, Examples 2-2 and 4-1 to 4-6 had good evaluation results of the rubbing resistance in recording on glossy paper, the unevenness in recording on regular paper, and the re-dispersion property. Especially, Examples 2-2, 4-3, and 4-4, in which the weight ratio E:P was in the range of 1:4 to 4:1 (i.e., (E/P)=0.25 to 4), had very good evaluation results of the rubbing resistance in recording on glossy paper, the unevenness in recording on regular paper, and the re-dispersion property.

Examples 5-1 to 5-3

Examples 5-1 to 5-3 were examples further containing the PO diol, using mutually different pigments, and adopting mutually different blending amounts of the water-soluble resin. Components, except for each pigment dispersion liquid or the self-dispersible pigment, which were included in Ink composition (TABLE 5) were mixed uniformly or homogeneously; and thus an ink solvent was obtained. Subsequently, the aqueous solution of the water-soluble resin and the ink solvent were added to each pigment dispersion liquid or the self-dispersible pigment dispersed in water, followed by being mixed uniformly. After that, the obtained mixture was filtrated through a cellulose acetate membrane filter (pore size 3.00 μm) produced by Toyo Roshi Kaisha, Ltd., and thus the water-based ink for ink-jet recording of each of Examples 5-1 to 5-3 was obtained.

Regarding the water-based inks of Examples 5-1 to 5-3, the evaluation of rubbing resistance in recording on glossy paper, the evaluation of unevenness in recording on regular paper, and the evaluation of re-dispersion property were performed similarly to Examples 1-1 to 1-3 and Comparative Example 1-1.

TABLE 5 shows the water-based ink compositions and the evaluation results for the water-based inks of Examples 5-1 to 5-3. Note that TABLE 5 also shows the water-based ink composition and the evaluation result for the water-based ink of Example 2-2.

TABLE 5

|  |  |  | Examples | | | |
| --- | --- | --- | --- | --- | --- | --- |
|  |  |  | 2-2 | 5-1 | 5-2 | 5-3 |
| Ink Composition (% by weight) | Pigment dispersion liquid 1 (*1) | | 5.00 | 5.00 | — | — |
|  | CAB-O-JET (trade name) 465M (*4) | | — | — | 5.00 | — |
|  | Pigment dispersion liquid 2 (*5) | | — | — | — | 5.00 |
|  | BTG | | 5.00 | 5.00 | 5.00 | 5.00 |
|  | TPG | | 5.00 | 5.00 | 5.00 | 5.00 |
|  | | Weight average molecular weight | Acid value mg KHO/g | | | | |
|  | Water-soluble resin 1 | 10,000 | 130 | 1.00 | 0.20 | 2.50 | 1.00 |
|  | SUNNOL (trade name) NL1430 (*2) | | 3.00 | 3.00 | 3.00 | 3.00 |
|  | 85% Glycerol | | 20.00 | 20.00 | 20.00 | 20.00 |
|  | Water | | balance | balance | balance | balance |
| EO ether:PO diol (E:P) | | | 1:1 | 1:1 | 1:1 | 1:1 |
| Rubbing resistance in recording on glossy paper | | | AA | AA | AA | AA |
| Unevenness in recording on regular paper | | | AA | AA | AA | AA |
| Re-dispersion property | | | A | A | A | A |

TABLE 5 (following)—LEGEND
(*1): C.I. pigment red 122 dispersion liquid containing 1.75% by weight of pigment dispersing resin
(*2): Anionic surfactant; produced by LION SPECIALITY CHEMICALS CO., LTD.
(*4): Self-dispersible pigment; produced by Cabot Corporation
(*5): C.I. pigment red 15:3 dispersion liquid containing 2% by weight of pigment dispersing resin Regarding numerals in TABLE 5, those of the pigment dispersion liquids, the self-dispersible pigment, and the water-soluble resin indicate solid content amounts and that of the surfactant indicates the active ingredient.

As shown in TABLE 5, Examples 5-1 to 5-3 had evaluation results of the rubbing resistance in recording on glossy paper, the unevenness in recording on regular paper, and the re-dispersion property which were equivalent to the evaluation results of Example 2-2.

As described above, the water-based ink of the present teaching has a good rubbing resistance in recording on glossy paper and is less likely to cause the unevenness in recording on regular paper. The way of use of the water-based ink of the present teaching is not particularly limited, and the water-based ink is widely applicable to various types of ink-jet recording.

What is claimed is:

1. A water-based ink for ink-jet recording, comprising:
   a pigment;
   water;
   oligoethylene glycol monoalkyl ether; and
   a water-soluble resin,
   wherein the water-soluble resin is an ABA-type triblock copolymer which has a polymer block A composed only of methyl methacrylate and methacrylic acid and a polymer block B composed only of benzyl methacrylate and methacrylic acid; which has a weight average molecular weight of 3,000 to 30,000; which has an acid value of 90 mgKOH/g to 200 mgKOH/g; and which is partially or completely neutralized.

2. The water-based ink for ink-jet recording according to claim 1, wherein the oligoethylene glycol monoalkyl ether includes an alkyl group having 1 to 6 carbon atoms.

3. The water-based ink for ink-jet recording according to claim 1, wherein the oligoethylene glycol monoalkyl ether includes an alkyl group having 4 carbon atoms.

4. The water-based ink for ink-jet recording according to claim 1, wherein a polymerization degree of ethylene glycol of the oligoethylene glycol monoalkyl ether is in a range of 2 to 4.

5. The water-based ink for ink-jet recording according to claim 1, wherein the oligoethylene glycol monoalkyl ether is diethylene glycol-n-butyl ether or triethylene glycol-n-butyl ether.

6. The water-based ink for ink-jet recording according to claim 1, wherein a ratio of a weight average molecular weight of the polymer block A to a weight average molecular weight of the polymer block B is in a range of 0.2 to 8.

7. The water-based ink for ink-jet recording according to claim 1, wherein a weight ratio of the methyl methacrylate to the methacrylic acid in the polymer block A is in a range of 1.7 to 3.8; and
  a weight ratio of the benzyl methacrylate to the methacrylic acid in the polymer block B is in a range of 3.8 to 32.0.

8. The water-based ink for ink-jet recording according to claim 1, wherein the ABA-type triblock copolymer is neutralized by potassium hydroxide.

9. The water-based ink for ink-jet recording according to claim 1, wherein the pigment is a resin-dispersible pigment.

10. The water-based ink for ink-jet recording according to claim 1, wherein the pigment is a self-dispersible pigment.

11. The water-based ink for ink-jet recording according to claim 1, wherein a weight ratio of a blending amount of the oligoethylene glycol monoalkyl ether in the water-based ink to a blending amount of the water-soluble resin in the water-based ink is in a range of 1 to 25.

12. The water-based ink for ink-jet recording according to claim 1, wherein a weight ratio of a blending amount of the water-soluble resin in the water-based ink to a blending amount of the pigment in the water-based ink is in a range of 0.04 to 0.5.

13. The water-based ink for ink-jet recording according to claim 1, further containing oligopropylene glycol.

14. The water-based ink for ink-jet recording according to claim 13, wherein a polymerization degree of propylene glycol of the oligopropylene glycol is in a range of 2 to 4.

15. The water-based ink for ink-jet recording according to claim 13, wherein the oligopropylene glycol is tripropylene glycol.

16. The water-based ink for inkjet recording according to claim 13, wherein a weight ratio of a blending amount of the oligoethylene glycol monoalkyl ether in the water-based ink to a blending amount of the oligopropylene glycol in the water-based ink is in a range of 0.25 to 4.

17. The water-based ink for inkjet recording according to claim 13, wherein a weight ratio of a total blending amount of the oligoethylene glycol monoalkyl ether and the oligopropylene glycol in the water-based ink to a blending amount of the water-soluble resin in the water-based ink is in a range of 4 to 50.

18. An ink cartridge comprising the water-based ink for ink-jet recording as defined in claim 1.

* * * * *